United States Patent
Kawasaki

(10) Patent No.: US 6,246,414 B1
(45) Date of Patent: Jun. 12, 2001

(54) IMAGE PROCESSING IN WHICH POLYGON IS DIVIDED

(75) Inventor: Tomoyuki Kawasaki, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/184,725

(22) Filed: Nov. 2, 1998

(30) Foreign Application Priority Data

Nov. 17, 1997 (JP) .................................... 9-315655

(51) Int. Cl.⁷ .................................... G06T 15/00
(52) U.S. Cl. .................................... 345/419; 345/426
(58) Field of Search .................................... 345/418, 419, 345/425, 426, 427, 428, 429, 430

(56) References Cited

U.S. PATENT DOCUMENTS 5,224,208 * 6/1993 Miller, Jr. et al. .................. 345/425
5,912,671 * 6/1999 Oka ...................................... 345/427
6,005,583 * 12/1999 Morrison ............................. 345/425

FOREIGN PATENT DOCUMENTS 3-27187   12/1991  (JP) .
4-155592  5/1992   (JP) .
7-200867  8/1995   (JP) .
8-138083  5/1996   (JP) .
304254    5/1984   (TW) .

OTHER PUBLICATIONS

"New Technology", ASCII. vol. 19, Jan. 1995, pp. 426–431.
Pixel No. 125, Publilshed by Pattern Processing Information Centre (1993), T. Yasuda, S. Tokai 'Biotexture and Mapping', p.43–47.

* cited by examiner

Primary Examiner—Cliff N. Vo
(74) Attorney, Agent, or Firm—Scully, Scott, Murphy & Presser

(57) ABSTRACT

In an image processing apparatus, a polygon dividing section selectively divides each of a set of polygons approximately representing a three-dimensional object based on a geometric data of the polygon and a reference data to convert the set of polygons into a new set of polygons. A brightness calculating section calculates a brightness of each of apexes of each of the new set of polygons to represent the three-dimensional object when a light is irradiated to the three-dimensional object. A display control section displays a three-dimensional image corresponding to the three-dimensional object viewed from a viewpoint on a display unit with the calculated brightnesses.

24 Claims, 9 Drawing Sheets

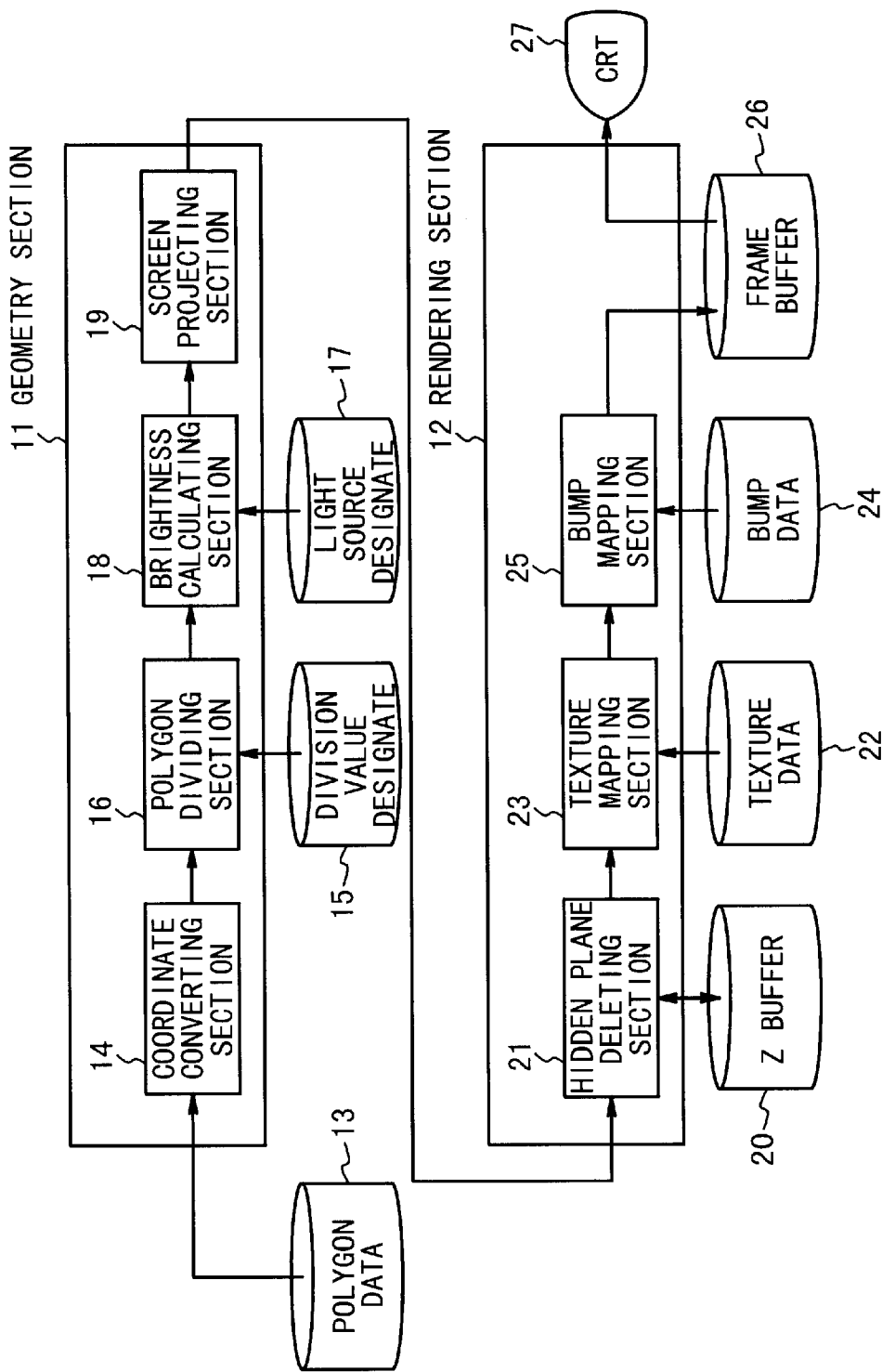

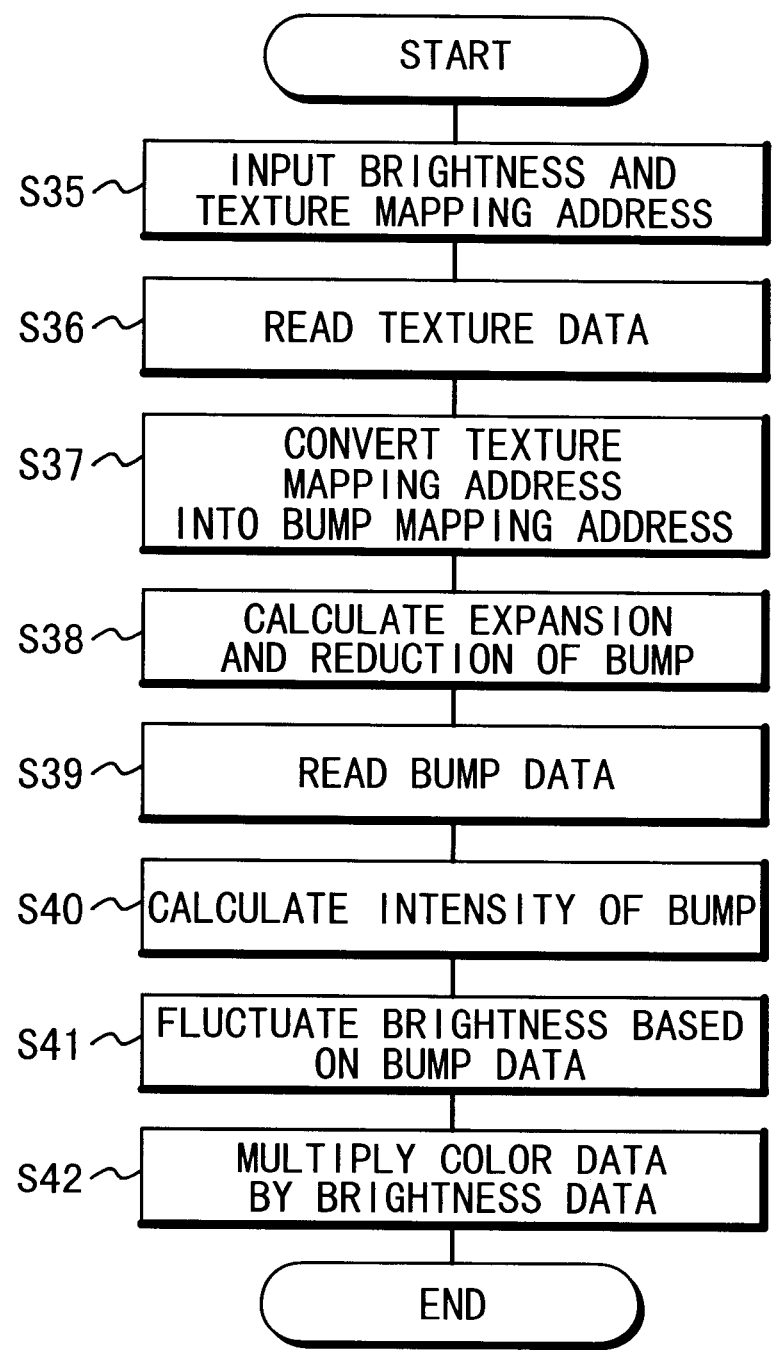

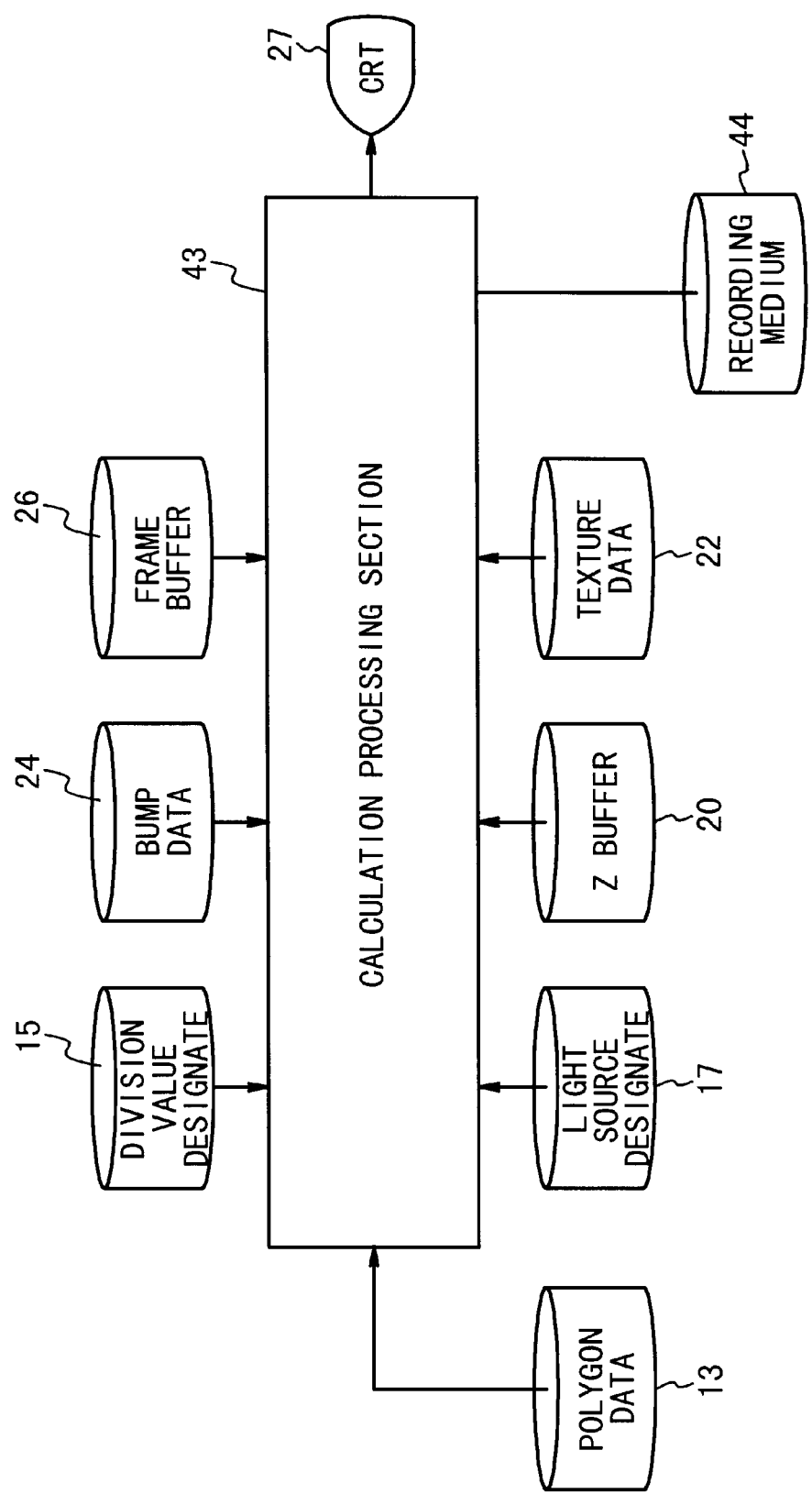

IMAGE PROCESSING IN WHICH POLYGON IS DIVIDED

BACKGROUND OF THE INVENTION

1. Field of the Invention

The present invention relates to an image processing apparatus and an image processing method and, more particularly, to an image processing apparatus and an image processing method which can carry out an image process at a high speed to display a three-dimensional image of a three-dimensional object with reality.

2. Description of the Related Art

In a conventional three-dimensional image processing apparatus, a glow shading or a phone shading described in a reference (ASCII. Vol. 19) is carried out when a three-dimensional image is displayed on a screen. The glow shading is a method of calculating the brightnesses of respective apexes of each of a plurality of polygons to be described later, and linearly interpolating the brightness on the polygon plane based on the calculated values and then determining the brightness of the respective pixels within a three-dimensional image data (hereafter, to be referred to as polygon data). However, this method can not represent a slight change of the brightness in each polygon. A point at which the plurality of polygons are in contact with each other is prominent in a three-dimensional image corresponding to a three-dimensional object having a large curvature. Also, an intensity of a light is mixed on the whole surface of the polygon. As a result, a highlight seems to be unnatural.

The phone shading is a method of considering angles between a polygon having a flat plane and peripheral polygons having flat planes, and then deriving a curved surface in a true state and thereby calculating all brightnesses of the respective pixels within the polygon. Although this method can represent the slight change of the brightness of each pixel within the polygon, a processing speed is slow because of the need of a complex brightness calculation for each pixel. The brightness calculation performed in units of pixels is a process with a heavy load. Thus, it is necessary for the execution of a high speed operation that a plurality of brightness calculation processes are performed in parallel. Hence, the phone shading requires a circuit size larger than a circuit size for the glow shading. For this reason, the phone shading technique can not cope with a television game in which the high speed process is required. Therefore, the glow shading method is usually used in the television game.

Now, the polygon will be described. FIGS. 1A to 1C are schematic diagrams to explain the polygon. At first, an image of an object surface is divided on the basis of a density corresponding to the resolution of an input mapping pattern. At this time, for example, if the resolution of a value representative of a degree of a relative irregularity in respective pixels of the mapping pattern, i.e., a Z value is 4×4, the object surface image is divided into 4×4 as shown in FIG. 1A. A central point of each of regions obtained by the division is set as an inner apex T, and the coordinates of each inner apex T are shifted in accordance with a value corresponding to the Z value of the mapping pattern. At this time, in a case of a plane surface mapping, the coordinates of the inner apex T are shifted upward and downward in a direction vertical to a flat surface. In a case of a curved surface mapping, the coordinates of the inner apex T are shifted upward and downward in a curved radius direction of a curved surface. Thus, the curved surface is formed as shown in FIG. 1B. This curved surface is divided into a plurality of polygons, especially, to have triangle shapes. As a result, the data of each triangle shape P shown in FIG. 1C is obtained as a polygon data.

By the way, when a design and consideration are carried out by using a computer graphic, it is desired to represent the material feeling of an actual object, namely, to represent the delicate irregular feeling and color on the object surface. Displacement mapping is well known as a method of representing the irregularity on the object surface. However, it is difficult in this method to obtain the information about how the irregularity is to be represented.

A conventional image processing apparatus is disclosed in Japanese Laid Open Patent Application (JP-A-Heisei 3-271877). The image processing apparatus disclosed in this reference is an apparatus for giving and displaying desired irregularity, color or pattern to an object surface. The conventional image processing apparatus is composed of a mapping pattern data having a z value. In the image processing apparatus, each pixel is raised or lowered in accordance with the z value so that the irregularity is given to the surface of a three-dimensional image. Also, a mapping section refers to the color of each pixel in the mapping pattern to give the color and/or pattern to the surface of the three-dimensional image. However, the process of giving the irregularity is very complex, so that the number of polygons is excessively increased. As a result, the process speed is decreased.

For example, the image processing apparatus disclosed in the above mentioned reference is realized to use the glow shading. In this case, a displacement mapping process of giving an irregularity to the object surface image and a process of calculating the brightnesses of polygons increased through by the above mentioned process must be executed, so that the load becomes heavier. In order to attain the high speed operation, it is necessary to execute the plurality of displacement mapping processes and the plurality of brightness calculating processes in parallel, as mentioned above. This results in extreme increase of the circuit size as compared with the glow shading.

For example, in a three-dimensional image process used in the television game, it is necessary that an object is operated or moved in real time with reality without uneasiness, in response to information inputted by a key operation of an operator. However, the conventional image processing apparatus has been used only in a range of a static image in which the processing speed is not relatively important, similarly to the glow shading method and the phone shading method.

SUMMARY OF THE INVENTION

The present invention is accomplished in view of the above mentioned problems. It is therefore an object of the present invention to provide an image processing apparatus which can process an image representation at a high speed with reality and make a circuit structure as simple as possible.

Another object of the present invention is to provide an image processing method which can process an image representation at a high speed with reality.

In order to achieve an aspect of the present invention, an image processing apparatus includes a display unit, a polygon dividing section for selectively dividing each of a set of polygons approximately representing a three-dimensional object based on a geometric data of the polygon and a reference data to convert the set of polygons into a new set of polygons. A brightness calculating section calculates a brightness of each of apexes of each of the new set of polygons to represent the three-dimensional object when a light is irradiated to the three-dimensional object. A display control section displays a three-dimensional image corresponding to the three-dimensional object viewed from a viewpoint on the display unit with the calculated brightnesses.

The image processing apparatus may further include a coordinate converting section for coordinate-converting polygon data representing each of a plurality of polygons approximately representing the three-dimensional object based on at least one of a rotation instruction, an expansion instruction, a contraction instruction and a shift instruction to produce the set of polygons.

The display control section may includes a hidden surface deleting section for removing the whole portion or a portion of each of the new set of polygons which is not viewed from the viewpoint.

Also, the display control section may include a texture mapping section for mapping a texture data to a pixel associated with each of the new set of polygons which is viewed from the viewpoint.

In addition, the display control section may include a bump mapping section for calculating expansion or contraction of a bump to produce a bump data, and for mapping the bump data to a pixel associated with each of the new set of polygons which is viewed from the viewpoint.

The polygon dividing section divides each of the set of polygons into new polygons based on lengths of sides of each of the set of polygons and the reference data. When each of the set of polygons has a triangle shape, the polygon dividing section compares the length of each of the sides of each of the set of polygons with the reference data and divides each of the set of polygons into the new polygons when the length of at least one of the sides is longer than the reference data. In this case, the polygon dividing section divides each of the set of polygons into the four new polygons when the lengths of the three sides are all longer than the reference data, divides each of the set of polygons into the three new polygons when the lengths of two of the three sides are all longer than the reference data, and divides each of the set of polygons into the two new polygons when the length of one of the three sides is all longer than the reference data.

Also, the polygon dividing section may divide each of the set of polygons into new polygons based on the reference data and average unit normal vectors which are obtained by averaging normal vectors of planes contacting each of apexes of each of the set of polygons to have a unit magnitude. In this case, the polygon dividing section desirably calculates angles between every two of the average unit normal vectors, and divides each of the set of polygons into new polygons when at least one of the angles is larger than the reference data. Instead, the polygon dividing section may calculate component angles between every two of the average unit normal vectors in units of components, and divide each of the set of polygons into new polygons when at least one of the components angles is larger than the reference data.

In order to achieve another aspect of the present invention, a method of displaying a three-dimensional image corresponding to a three-dimensional object, includes the steps of:

selectively dividing each of a set of polygons approximately representing a three-dimensional object based on a geometric data of the polygon and a reference data to convert the set of polygons into a new set of polygons;

calculating a brightness of each of apexes of each of the new set of polygons to represent the three-dimensional object when a light is irradiated to the three-dimensional object; and displaying a three-dimensional image corresponding to the three-dimensional object viewed from a viewpoint on a display unit with the calculated brightnesses.

BRIEF DESCRIPTION OF THE DRAWINGS

FIG. 2 is a system block diagram showing the structure of an image processing apparatus according to a first embodiment of the present invention;

FIG. 7 is a flowchart showing a bump mapping process in the image processing apparatus according to the first embodiment of the present invention;

FIG. 9 is a system block diagram showing the structure of an image processing apparatus according to a third embodiment of the present invention.

DESCRIPTION OF THE PREFERRED EMBODIMENTS

Figure 1A:
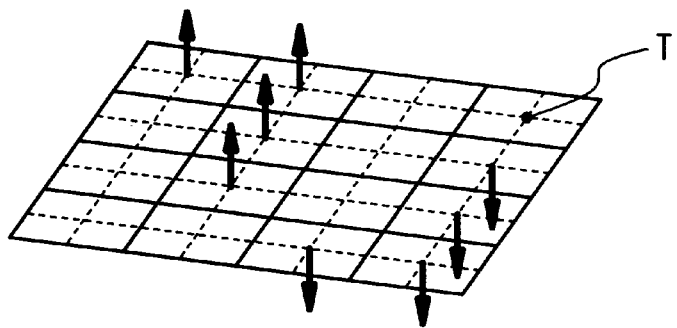
FIG. 1A is a diagram showing a state at which an object surface image is divided
Figure 1B:
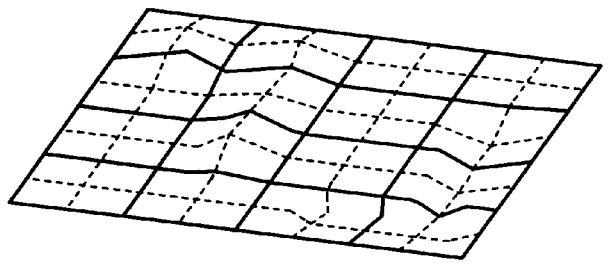
FIG. 1B is a diagram showing a state at which the coordinates of an inner apex are shifted and then a curved surface is formed.
Figure 1C:
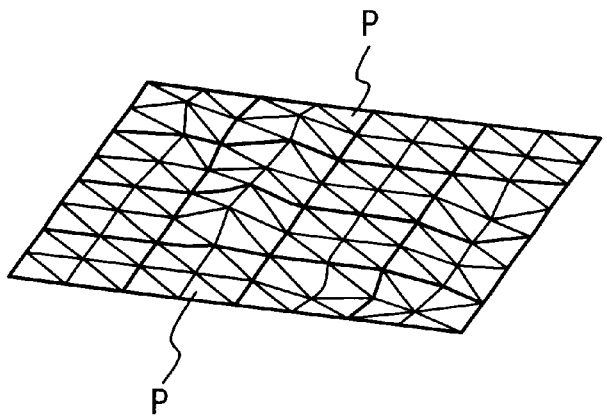
FIG. 1C is a diagram showing a state at which the curved surface is divided into triangles and then a number of polygons are formed.

The image processing apparatus of the present invention will be described below in detail with reference to the attached drawings.

FIG. 2 is a system block diagram showing the image processing apparatus according to the first embodiment of the present invention. The image processing apparatus is composed of a geometry section 11 for mainly carrying out a process of dividing a polygon and a rendering section 12 for mainly carrying out a bump mapping process. The bump mapping process is a method of giving an irregularity (bump) to a three-dimensional image corresponding to a three-dimensional object. The three-dimensional image is not made to have an irregular surface and normal vectors are fluctuated in accordance with information indicative of the irregularity, i.e., bump data. Therefore, a simple object surface seems to be irregular.

Respective processes within the geometry section 11 will be described. The geometry section 11 is composed of a coordinate converting section 14, a polygon dividing section 16, a brightness calculating section 18 and a screen projecting section 19.

The coordinate converting section 14 has a function of converting the coordinates of each of a set of polygons of the three-dimensional image approximately representing the three-dimensional object. The coordinate converting section 14 receives, from a polygon data storage unit 13, a polygon data composed of the three-dimensional coordinates of each of apexes of each of the set of polygons, an average unit normal vector and a texture mapping address, to execute a coordinate converting process such as a rotation, an expansion, a contraction, a shift.

The polygon dividing section 16 compares lengths of respective sides of each of the set of polygons sent from the coordinate converting section 14 with a reference value defined by a division value designating section 15. The polygon dividing section 16 repeats the division of the polygon until the lengths of the respective sides are equal to or less than the reference value.

Figure 3:
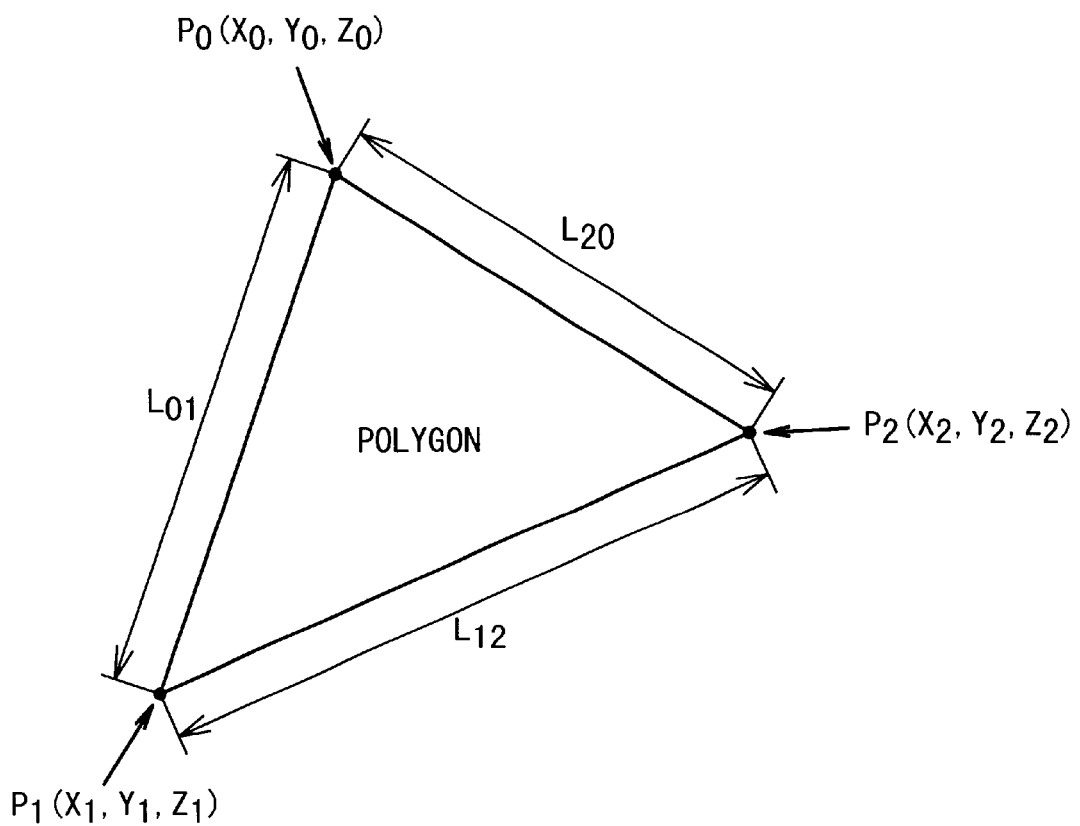
FIG. 3 is a diagram showing lengths of respective sides of a polygon.

Now, calculation equations necessary when the polygon is divided will be described. FIG. 3 is a diagram showing the lengths of the sides of the polygon. It is supposed that the three-dimensional space coordinates are X, Y and Z, respectively, and the coordinates of the respective apexes of the polygon are P0(X0,Y0,Z0), P1(X1,Y1,Z1) and P2(X2, Y2,Z2). In this case, the lengths Lnm (nm=01, 12, 20 in this case) of the respective sides of the polygon are determined by the following equation (1).

$$Lnm = (|Xn-Xm|^2 + |Yn-Ym|^2 + |Zn-Zm|^2)^{1/2} \ (nm=01, 12, 20) \quad (1)$$

In the equation (1), $|Xn-Xm|$, $|Yn-Ym|$ and $|Zn-Zm|$ represent the X, Y and Z components of the lengths of the respective sides, respectively. However, since the calculation is complex, the equation (1) may be simplified. For instance, the longest component of the X, Y and Z components is selected as the length of the respective sides of the polygon, as shown in a following equation (2).

$$Lnm \approx |Xn-Xm| \ or \ |Yn-Ym| \ or \ |Zn-Zm| \ (nm=01, 12, 20) \quad (2)$$

It is supposed that the space coordinates are X, Y and Z, the vertical component and the horizontal component of the texture mapping address are U and V, respectively, the X, Y and Z components of the average unit normal vector are Nx, Ny and Nz, respectively, and the respective apexes of the polygon are Pn (Xn, Yn, Zn, Un, Vn, Nxn, Nyn, Nzn (n=0, 1, 2)). In this case, the respective components at the central points Pnm (Xnm, Ynm, Znm, Unm, Vnm, Nxnm, Nynm, Nznm (nm=01, 12, 20)) of the respective sides of the polygon are determined by the following equation (3).

$$Anm=(An-Am)/2 \ (A=X, Y, Z, U, V, Nx, Ny, Nz; nm=01, 12, 20) \quad (3)$$

The brightness calculating section 18 has a function of calculating the brightness of each of the apexes of each of the set of polygons such that the three-dimensional image can be displayed to be view from a viewpoint when a light is irradiated to the three-dimensional object. The brightness calculating section 18 calculates the brightness of each apex of each polygon on the basis of a distance between the polygon sent by the polygon dividing section 16 and a point light source (or a parallel light source) specified by a light source designating section 17, and an angle of a normal vector specified by the light source designating section 17. The screen projecting section 19 has a function of projecting the polygon obtained by the brightness calculating section 18 onto a screen for the three-dimensional image to be viewed from the viewpoint.

Next, respective processes within the rendering section 12 will be described below. The rendering section 12 is composed of a hidden plane deleting section 21, a texture mapping section 23 and a bump mapping section 25.

The hidden plane deleting section 21 has a function of giving a limitation to remove the display of an image portion which cannot be viewed from the viewpoint. The hidden plane deleting section 21 receives the polygon having the screen coordinates, the brightness and the texture mapping address from the screen projecting section 19 as each apex data. Then, the hidden plane deleting section 21 interpolates each apex data and determines a pixel data indicative of each of pixels within the polygon. The hidden plane deleting section 21 further compares a Z value of the determined pixel data with a previous Z value stored in a Z buffer 20 and determines whether or not the Z value of the pixel is a value related to visibility. As a result, if the Z value of the pixel is the value related to the visibility, the hidden plane deleting section 21 updates the Z value in the Z buffer 20 to make the pixel data effective. If the Z value of the pixel is not the value related to the visibility, the pixel data is discarded.

The texture mapping section 23 has a function of pasting a corresponding texture data 22 on the pixel data passed through the hidden plane deleting section 21 in accordance with the texture mapping address.

The bump mapping section 25 reads, from a bump data storage unit 24, a bump data corresponding to the bump mapping address after an expansion/contraction calculating process of the bump, and then calculates the intensity to fluctuate the brightness.

Now, equations necessary for the bump mapping process will be described. It is supposed that the vertical component and horizontal component of the bump mapping address are Ub and Vb, respectively, the Ub component and Vb component of the expansion/contraction rate to the bump are Ubscale and Vbscale, respectively, and the output bump mapping addresses are Ub' and Vb', respectively. In this case, the expansion/contraction calculation of the bump is determined by the following equation (4).

$$Ub'=Ub \times Ubscal, \ Vb'=Vb \times Vbscale \quad (4)$$

Supposing that a bump data corresponding to the bump mapping addresses Ub' and Vb' is Bump, and the intensity rate of the bump is Bp, and the bump data after the calculation of the intensity is Bump'. Then, this bump data is determined by a following equation (5).

$$Bump'=Bump \times Bp \quad (5)$$

The pixel data passed through the bump mapping section 25 is once stored in a frame buffer 26. Then, the three-dimensional image for one frame is outputted to and displayed on a CRT 27.

Figure 4:
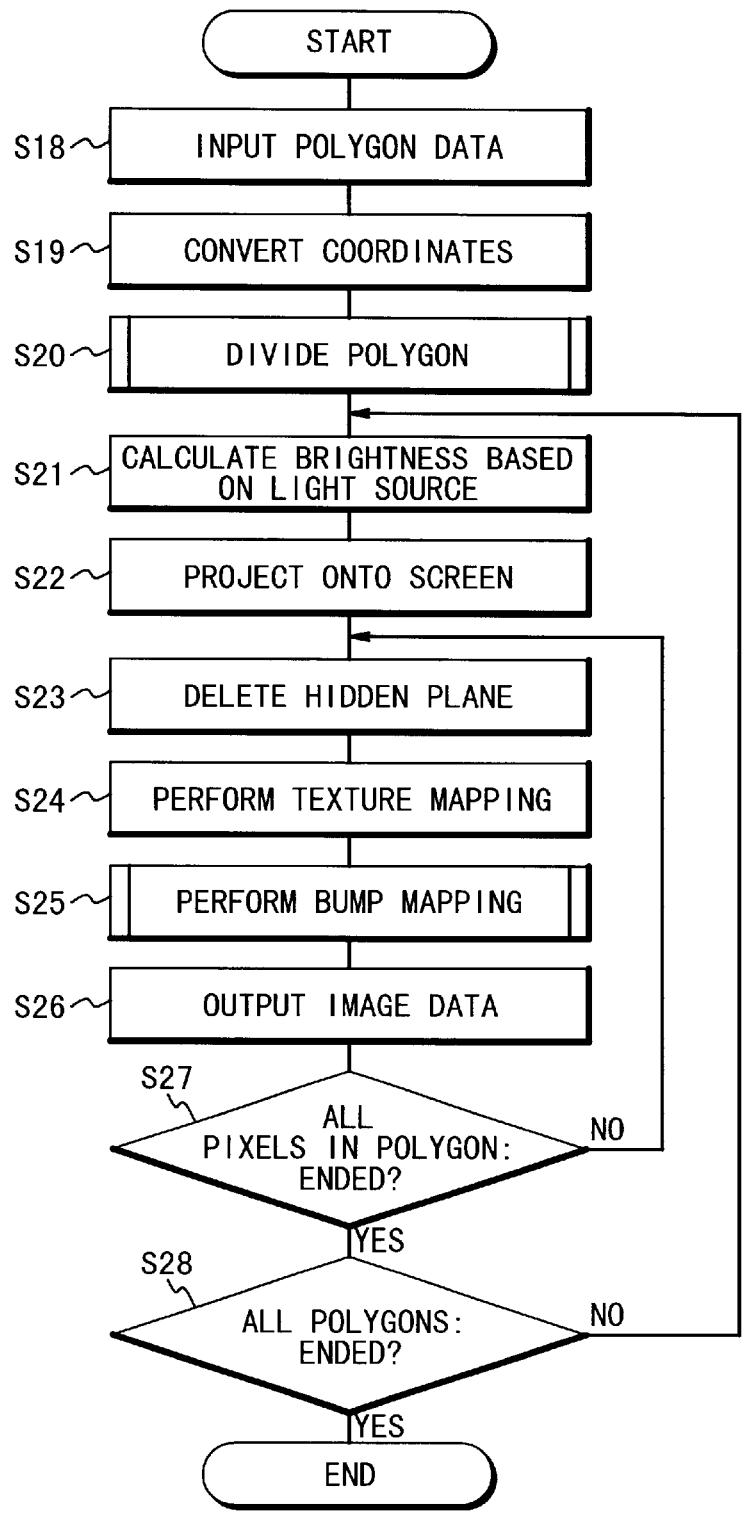
FIG. 4 is a flowchart showing the whole operation of the image processing apparatus according to the first embodiment of the present invention.

Next, an operation of the image processing apparatus according to the first embodiment of the present invention will be described below. FIG. 4 is a flowchart showing the operation of the whole image processing apparatus.

At first, at a step S18, the polygon data for a set of polygons is inputted, each of which has three-dimensional coordinates, an average unit normal vector and a texture mapping address. Then, the coordinates of each of the set of polygons are converted by the coordinate converting section 14. The polygon is further divided if there may be the possibility that the brightness within the polygon largely changes (Steps S19 and S20).

At a step S21, the brightness of each of the apexes of the polygon is calculated by the brightness calculating section 18 on the basis of the distance between the polygon and the point light source (or the parallel light source) specified by the light source designating section 17 and the angle of the normal vector. At a step S22, the polygon is projected onto the screen viewed from a viewpoint. At a step S23, whether or not the polygon is visible is determined by the hidden plane deleting section 21 by comparing the Z value in each of pixels within the polygon with a Z value previously stored in the Z buffer 20. At this time, if the polygon is visible, the Z value in the Z buffer 20 is updated by the Z value of the pixel and the pixel data is made effective. If the polygon is not visible, the pixel data is discarded.

Next, at a step S24, the corresponding texture data is pasted on the pixel data in accordance with the texture mapping address by the texture mapping section 23. At a step S25, the bump data is read from a bump data storage unit 24, and the bump mapping process is performed to the pixel. Then, the brightness of the pixel is fluctuated and outputted to a frame buffer 26 (Step S26).

Moreover, at a step S27, it is determined whether or not the processes to all the pixel within the polygon are ended. If all the pixels are not processed, the operational flow returns back to the step S23, and the process is repeated. If the process is ended, the operational flow proceeds to a step S28. At the step 28, it is determined whether or not the processes of all the polygons are ended. As a result, if all the polygons are not processed, the operational flow returns back to the step S21, and the process is repeated. If all the polygons are processed, the process is ended. Of the above mentioned respective processes, the processes at the steps S18 to S22 are executed in units of polygons, and the processes at the steps S23 and S25 are executed in units of pixels.

Figure 5:
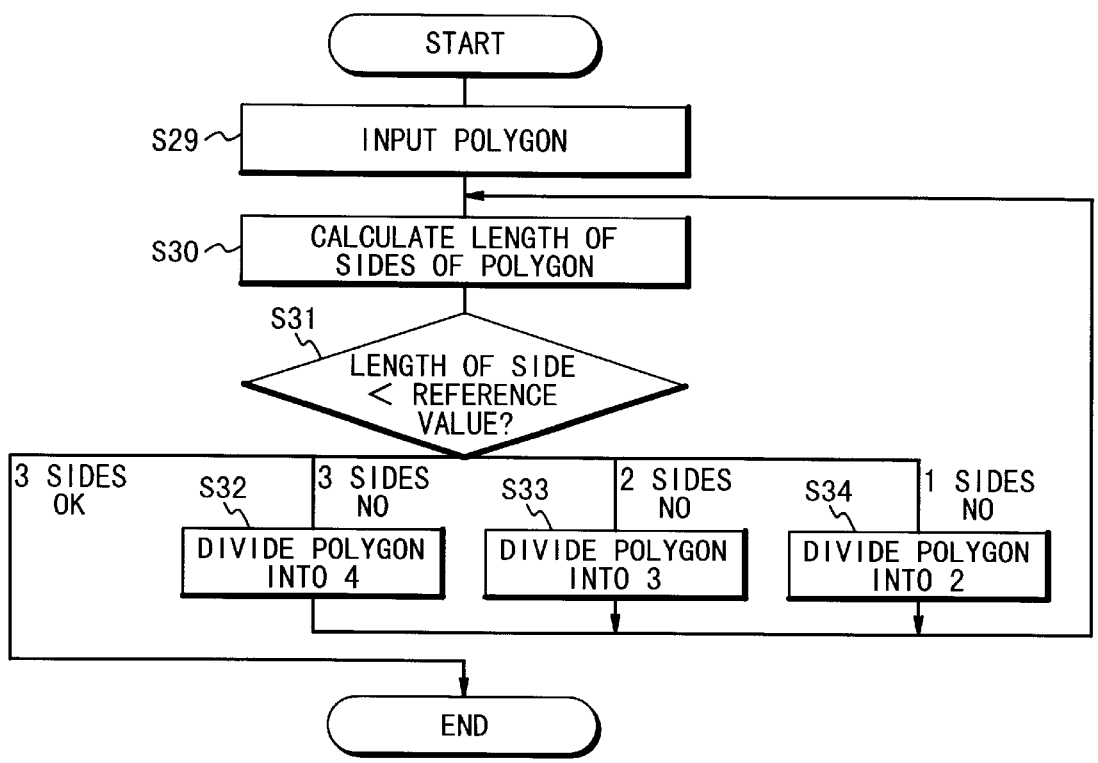
FIG. 5 is flowcharts showing a polygon dividing procedure in the image processing apparatus according to the first embodiment of the present invention.
Figure 6A:
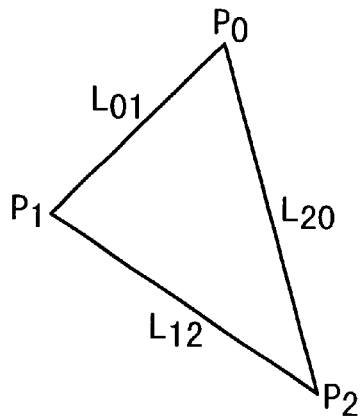
FIGS. 6A and 6B are schematic diagrams showing a case in which all of three sides of the polygon exceed a reference value.
Figure 6B:
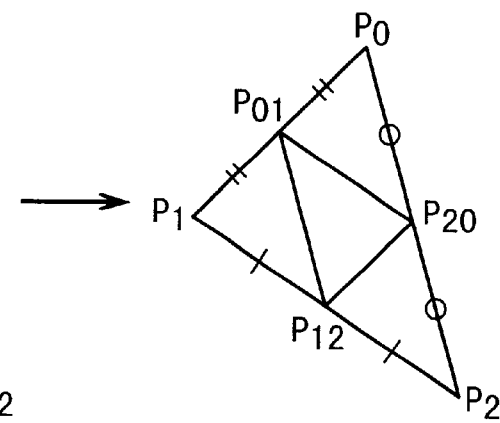
Figure 6C:
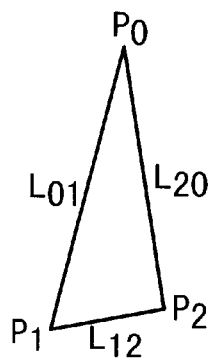
FIGS. 6C and 6D are schematic diagrams showing a case in which two sides of the sides in the polygon exceed the reference value.
Figure 6D:
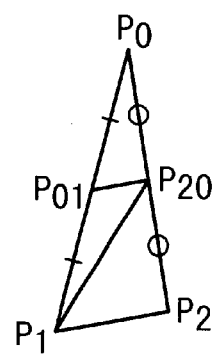
Figure 6E:
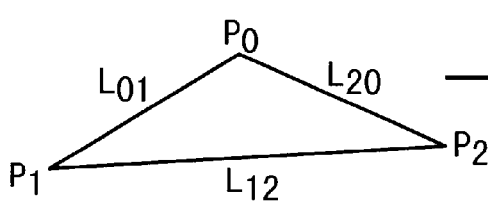
FIGS. 6E and 6F are schematic diagrams showing a case in which one side of the sides in the polygon exceeds the reference value.

Now, the polygon dividing process will be described with reference to FIG. 5 and FIGS. 6A to 6F. FIG. 5 is a flowchart showing a subroutine when the polygon is divided at the step S20 in FIG. 4. In FIGS. 6A to 6F which are schematic diagrams showing actual examples of dividing the polygon. FIG. 6A shows a case in which all of three sides (L01, L12 and L20) of the polygon are larger than a reference value L. FIG. 6C shows a case in which two of the sides L01, L12, L20 of the polygon are larger than the reference value L, e.g., L20, L01>L. FIG. 6E shows a case in which one of the sides L01, L12 and L20 of the polygon is larger than the reference value L, e.g., L12>L.

Figure 6F:
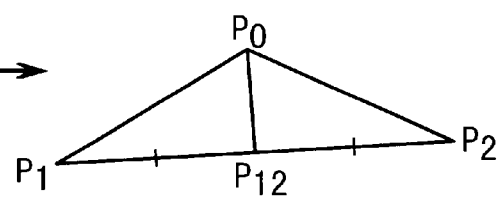

At first, at a step S29, the polygon data of a polygon is inputted which has the three-dimensional coordinates, the average unit normal vector and the texture mapping address. Then, the lengths of the respective sides of the polygon are calculated at a step S30. At this time, the lengths of the respective sides in the polygon are compared with the reference value L at a step S31. If all the three sides exceed the reference value L, at a step S32 the three sides of the polygon are respectively equally cut in half, and accordingly the polygon is divided into four new polygons, as shown in FIG. 6B. If only two sides exceed the reference value L, at a step S33 the two sides of the polygon are respectively equally cut in half, and accordingly the polygon is divided into three new polygons, as shown in FIG. 6D. Also, if only one side exceeds the reference value L, at a step S34 the one side of the polygon is equally cut in half, and accordingly the polygon is divided into two new polygons, as shown in FIG. 6F.

After the processes at the steps S32 to S34 are respectively ended, the operational flow returns back to the step S30. The processes are repeated until all the three sides of the polygon become equal to or less than the reference value L.

Next, the bump mapping process will be described below. FIG. 7 is a flowchart showing a subroutine with regard to the bump mapping at the step S25 in FIG. 3.

At first, the texture mapping address and the brightness are inputted from the hidden plane deleting section 21 to the texture mapping section 23 at a step S35. The texture data corresponding to the texture mapping address is read from the texture data storage unit 22 at a step S36. The texture mapping address is converted into the bump mapping address at a step S37. Then, the expansion/contraction calculation of the bump is executed at a step S38. The bump data corresponding to the bump mapping address is read from the bump data storage unit 24 at a step S39. The intensity of the bump is calculated at a step S40. Moreover, the brightness is fluctuated in accordance with the calculated bump data at a step S41. The brightness information is multiplied by the texture data, i.e., color data of R, G and B at a step S42.

Figure 8:
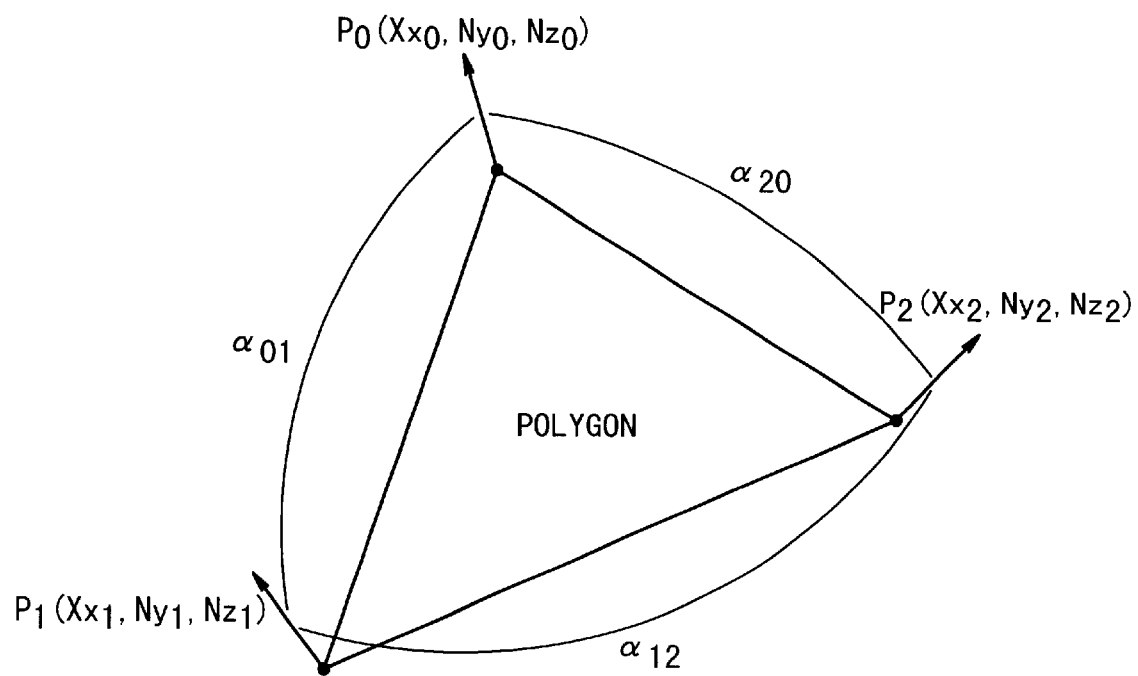
FIG. 8 is a schematic diagram showing angles of between respective apexes of a polygon in the image processing apparatus according to a second embodiment of the present invention.

Next, an image processing apparatus according to the second embodiment of the present invention will be described below. FIG. 8 is a schematic diagram showing states of respective sides of a polygon. The structure and operations of the image processing apparatus in this embodiment are similar to those of the first embodiment, other than those of the polygon dividing section 16. Therefore, only the polygon dividing section 16 having a different function will be described.

The polygon dividing section 16 in this embodiment (refer to FIG. 2) carries out the polygon division calculation, similarly to the case of the first embodiment. The operations in this embodiment are equivalent to those in the case where the lengths of the sides of the polygon in the first embodiment are replaced by the angles between the average unit normal vectors.

That is, the polygon dividing section 16 receives the average unit normal vectors in which the normal vectors on the planes in contact with respective apexes of the polygon are averaged, and which has the magnitude of 1. Then, the polygon dividing section 16 calculates an angle between every two of the average unit normal vectors and compares with a reference value. If the angle exceeds the reference value, the polygon is further divided. The division is repeated until the angle becomes equal to or less than the reference value. The average unit normal vector is calculated by the coordinate converting section 14 (refer to FIG. 2).

Now, an equation will be described to determine the angle between two of the average unit normal vectors of the respective apexes of the polygon. It is supposed that the average unit normal vectors of the respective apexes of the polygon are Nxn, Nyn and Nzn, respectively. In this case, angles $\alpha nm$ (nm=01, 12, 20) between the two of the average unit normal vectors of the respective apexes of the polygon in FIG. 8 are determined by the following equation (6).

$$\sin(\alpha nm) = (Nxn \times Nxm + Nyn \times Nym + Nzn \times Nzm) \quad (nm=01, 12, 20) \quad (6)$$

where NxnxNxm, NynxNym and NznxNzm in the equation (6) represent angles between X components, Y components and Z components, respectively.

On the other hand, besides the equation (6), the following equation (7) in which the angles between the respective X, Y and Z components of the average unit normal vectors may be calculated. In this case, the greatest angle is selected and defined as an angle between the apexes, although this is not the method of determining the angle.

$$\sin(\alpha nm) = |Nxn \times Nxm| \text{ or } |Nyn \times Nym| \text{ or } |Nzn \times Nzm| \quad (nm=01, 12, 20) \quad (7)$$

Next, an image processing apparatus according to the third embodiment will be described. FIG. 9 is a block diagram of this image processing apparatus.

This image processing apparatus is composed of an operation processing section 43. The polygon data storage unit 13, the division value designating section 15, the light source designating section 17, the bump data storage unit 24, the Z buffer 20, the frame buffer 26, the texture data storage unit 22 and the CRT 27, which are similar to those of the image processing apparatus in FIG. 2, are connected to the operation processing section 43. Moreover, a recording medium 44 on which a geometry processing procedure including a polygon division is recorded as a processing program is further connected to the operation processing section 43. The recording medium 44 is composed of a magnetic disk, a semiconductor memory and the like.

This image processing apparatus reads the processing program from the recording medium 44 and sends to the operation processing section 43. The operation processing section executes the processes similar to those of the respective processing sections (14, 16, 18 and 19) within the geometry section 11 in the first embodiment and the respective processing sections (21, 23 and 25) within the rendering section 12.

As mentioned above, according to the image processing apparatus in the first to third embodiments, when the light from the light source is irradiated to the center of the slightly large polygon so that only the center of the polygon is brighter and the polygon becomes darker as the distance from the light source becomes longer, it is possible to divide the polygon and calculate the brightness of each of apexes the polygon. This improves the image quality as compared with the conventional glow shading.

Moreover, if there may be the possibility that the brightness within the polygon is largely changed, namely, if there may be the possibility that the image quality is reduced, it is possible to divide the polygon to calculate the brightness of each apex of the polygon. Thus, the image can be processed without reducing the image quality as compared with the conventional phone shading.

Furthermore, it is not necessary to calculate the brightness for each pixel, and it is sufficient to calculate only at the respective apexes of the divided polygon. Hence, the processing speed is extremely improved.

Also, the image processing apparatuses in the first to third embodiments can represent the bump by merely carrying out the simple calculation of multiplying the brightness of the polygon surface by the bump data, unlike the conventional displacement mapping. Hence, this enables the load of the calculating process to be lighter, which extremely improves the processing speed.

As mentioned above, the present invention has been described in accordance with the preferred embodiments. However, the image processing apparatus and the image processing method are not limited only to the above mentioned embodiments. The image processing apparatus and the image processing method in which various modifications and changes are added on the basis of the above mentioned embodiments are included in the scope of the present invention.

As described above, according to the present invention, it is possible to process the image representation at the high speed with reality. Also, it is possible to realize the image processing apparatus which can make the circuit structure thereof as simple as possible and also possible to implement the image processing method which can process the image representation at the high speed in the real state.

What is claimed is:

1. An image processing apparatus comprising:

a display unit;

polygon dividing means for selectively dividing each of a set of polygons approximately representing a three-dimensional object based on a geometric data of said polygon and a reference data to convert said set of polygons into a new set of polygons, wherein said polygon dividing means divides each of said set of polygons into new polygons based on lengths of sides of each of said set of polygons and said reference data;

brightness calculating means for calculating a brightness of each of apexes of each of said new set of polygons to represent said three-dimensional object when a light is irradiated to said three-dimensional object; and display control means for displaying a three-dimensional image corresponding to said three-dimensional object viewed from a viewpoint on said display unit with the calculated brightnesses.

2. An image processing apparatus according to claim 1, further comprising coordinate converting means for coordinate-converting polygon data representing each of a plurality of polygons approximately representing said three-dimensional object based on at least one of a rotation instruction, an expansion instruction, a contraction instruction and a shift instruction to produce said set of polygons.

3. An image processing apparatus according to claim 1, wherein said display control means comprises:

hidden surface deleting means for removing the whole portion or a portion of each of said new set of polygons which is not viewed from the viewpoint.

4. An image processing apparatus according to claim 1, wherein said display control means comprises:

texture mapping means for mapping a texture data to a pixel associated with each of said new set of polygons which is viewed from the viewpoint.

5. An image processing apparatus according to claim 1, wherein said display control means comprises:

a bump mapping section for calculating expansion or contraction of a bump to produce a bump data, and for mapping the bump data to a pixel associated with each of said new set of polygons which is viewed from the viewpoint.

6. An image processing apparatus according to claim 1, wherein each of said set of polygons has a triangle shape, and wherein said polygon dividing means compares the length of each of said sides of each of said set of polygons with said reference data and divides each of said set of polygons into said new polygons when the length of at least one of said sides is longer than said reference data.

7. An image processing apparatus according to claim 6, wherein said polygon dividing means divides each of said set of polygons into said four new polygons when the lengths of said three sides are all longer than said reference data, divides each of said set of polygons into said three new polygons when the lengths of two of said three sides are all longer than said reference data, and divides each of said set of polygons into said two new polygons when the length of one of said three sides is all longer than said reference data.

8. An image processing apparatus according to claim 1, wherein said polygon dividing means divides each of said set of polygons into new polygons based on said reference data and average unit normal vectors which are obtained by averaging normal vectors of planes contacting each of apexes of each of said set of polygons to have a unit magnitude.

9. An image processing apparatus according to claim 8, wherein said polygon dividing means calculates angles between every two of said average unit normal vectors, and divides each of said set of polygons into new polygons when at least one of said angles is larger than said reference data.

10. An image processing apparatus according to claim 8, wherein said polygon dividing means calculates component angles between every two of said average unit normal vectors in units of components, and divides each of said set of polygons into new polygons when at least one of said components angles is larger than said reference data.

11. A method of displaying a three-dimensional image corresponding to a three-dimensional object, comprising the steps of:

selectively dividing each of a set of polygons approximately representing a three-dimensional object based on a geometric data of said polygon and a reference data to convert said set of polygons into a new set of polygons, wherein said dividing step includes dividing each of said set of polygons into new polygons based on lengths of sides of each set of polygons and said reference data;

calculating a brightness of each of apexes of each of said new set of polygons to represent said three-dimensional object when a light is irradiated to said three-dimensional object; and displaying a three-dimensional image corresponding to said three-dimensional object viewed from a viewpoint on a display unit with the calculated brightnesses.

12. A method according to claim 11, further comprising the step of coordinate-converting polygon data representing each of a plurality of polygons approximately representing said three-dimensional object based on at least one of a rotation instruction, an expansion instruction, a contraction instruction and a shift instruction to produce said set of polygons.

13. A method according to claim 11, wherein said displaying step includes deleting the whole portion or a portion of each of said new set of polygons which is not viewed from the viewpoint.

14. A method according to claim 11, wherein said displaying step includes mapping a texture data to a pixel associated with each of said new set of polygons which is viewed from the viewpoint.

15. A method according to claim 11, wherein said displaying step includes:

calculating expansion or contraction of a bump to produce a bump data, and mapping the bump data to a pixel associated with each of said new set of polygons which is viewed from the viewpoint.

16. A method according to claim 11, wherein each of said set of polygons has a triangle shape, and wherein said dividing step includes:
comparing the length of each of said sides of each of said set of polygons with said reference data; and
dividing each of said set of polygons into said new polygons when the length of at least one of said sides is longer than said reference data.

17. A method according to claim 16, wherein said dividing step includes:

dividing each of said set of polygons into said four new polygons when the lengths of said three sides are all longer than said reference data;

dividing each of said set of polygons into said three new polygons when the lengths of two of said three sides are all longer than said reference data; and dividing each of said set of polygons into said two new polygons when the length of one of said three sides is all longer than said reference data.

18. A method according to claim 11, wherein said dividing step includes:

dividing each of said set of polygons into new polygons based on said reference data and average unit normal vectors which are obtained by averaging normal vectors of planes contacting each of apexes of each of said set of polygons to have a unit magnitude.

19. A method according to claim 18, wherein said dividing step includes:

calculating angles between every two of said average unit normal vectors; and dividing each of said set of polygons into new polygons when at least one of said angles is larger than said reference data.

20. A method according to claim 18, wherein said dividing step includes:

calculating component angles between every two of said average unit normal vectors in units of components; and dividing each of said set of polygons into new polygons when at least one of said components angles is larger than said reference data.

21. An image processing apparatus comprising:

a display unit;

polygon dividing means for selectively dividing each of a set of polygons approximately representing a three-dimensional object based on a geometric data of said polygon and a reference data to convert said set of polygons into a new set of polygons, wherein said polygons are triangles and the number of polygons each triangle is divided into is based upon the number of sides of the triangle whose length is greater than the reference data;

brightness calculating means for calculating a brightness of each of apexes of each of said new set of polygons to represent said three-dimensional object when a light is irradiated to said three-dimensional object; and display control means for displaying a three-dimensional image corresponding to said three-dimensional object viewed from a viewpoint on said display unit with the calculated brightnesses.

22. A method of displaying a three-dimensional image corresponding to a three-dimensional object, comprising the steps of:

selectively dividing each of a set of polygons approximately representing a three-dimensional object based on a geometric data of said polygon and a reference data to convert said set of polygons into a new set of polygons, wherein said polygons are triangles and the number of polygons each triangle is divided into is based upon the number of sides of the triangle whose length is greater than the reference data;

calculating a brightness of each of apexes of each of said new set of polygons to represent said three-dimensional object when a light is irradiated to said three-dimensional object; and displaying a three-dimensional image corresponding to said three-dimensional object viewed from a viewpoint on a display unit with the calculated brightnesses.

23. An image processing apparatus comprising:

a display unit;

polygon dividing means for selectively dividing each of a set of polygons approximately representing a three-dimensional object based on a geometric data of said polygon and a reference data to convert said set of polygons into a new set of polygons, wherein said polygon dividing means divides each of said set of polygons into new polygons based on said reference data and average unit normal vectors which are obtained by averaging normal vectors of planes contacting each of apexes of each of said set of polygons to have a unit magnitude;

brightness calculating means for calculating a brightness of each of apexes of each of said new set of polygons to represent said three-dimensional object when a light is irradiated to said three-dimensional object; and display control means for displaying a three-dimensional image corresponding to said three-dimensional object viewed from a viewpoint on said display unit with the calculated brightnesses.

24. A method of displaying a three-dimensional image corresponding to a three-dimensional object, comprising the steps of:

selectively dividing each of a set of polygons approximately representing a three-dimensional object based on a geometric data of said polygon and a reference data to convert said set of polygons into a new set of polygons, wherein said dividing step includes dividing each of said set of polygons into new polygons based on said reference data and average unit normal vectors which are obtained by averaging normal vectors of planes contacting each of apexes of each of said set of polygons to have a unit magnitude;

calculating a brightness of each of apexes of each of said new set of polygons to represent said three-dimensional object when a light is irradiated to said three-dimensional object; and displaying a three-dimensional image corresponding to said three-dimensional object viewed from a viewpoint on a display unit with the calculated brightnesses.

* * * * *